Dec. 2, 1952 A. SLATER 2,619,754
TRAWLING NET AND APPARATUS FOR USE THEREWITH
Filed Sept. 7, 1948 4 Sheets-Sheet 4
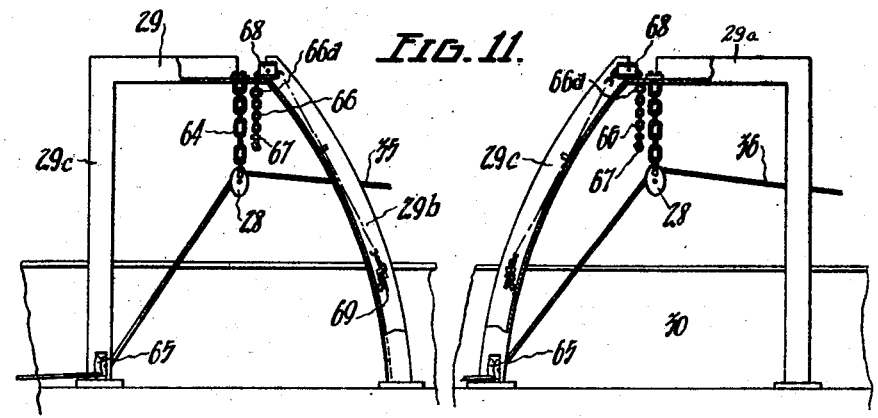
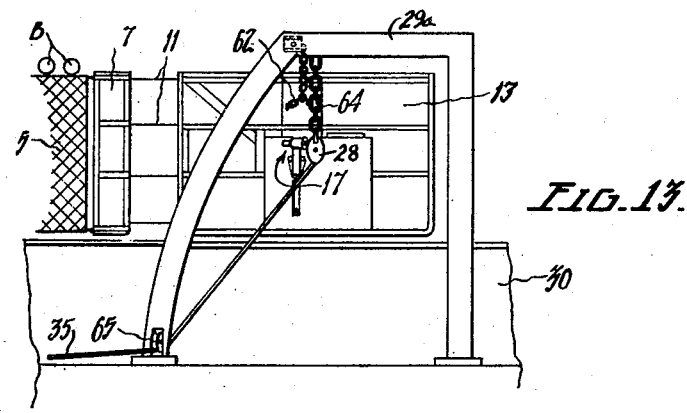
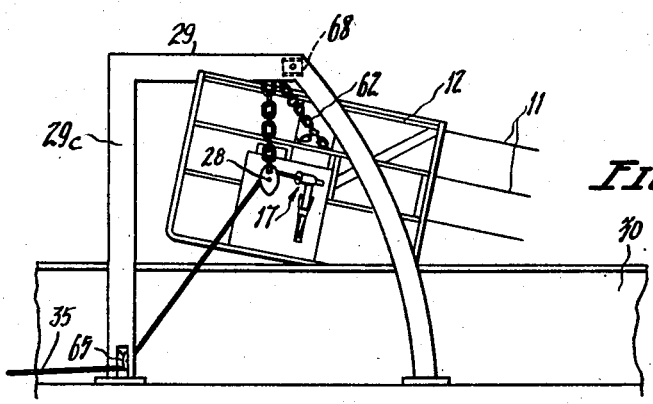

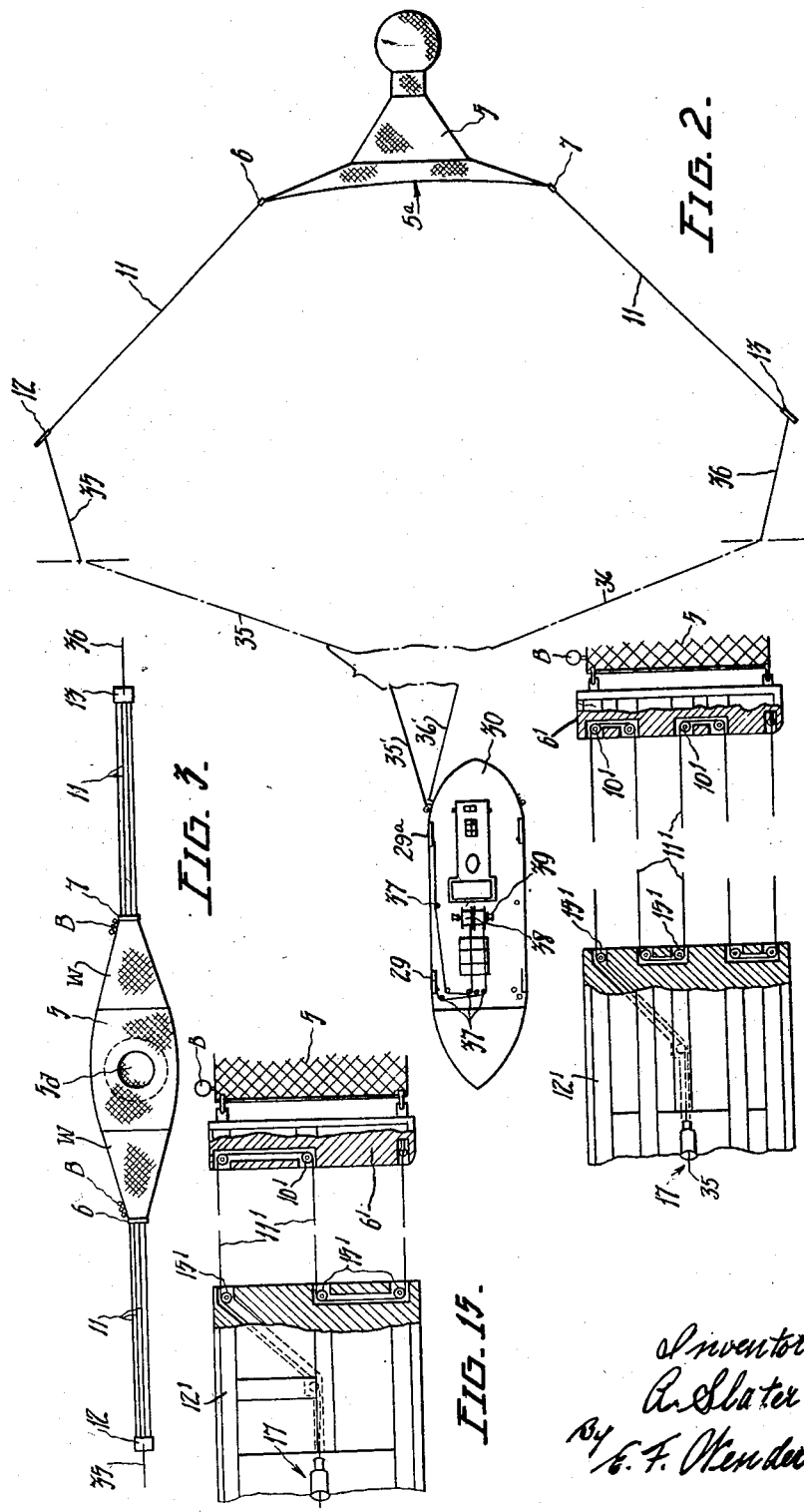

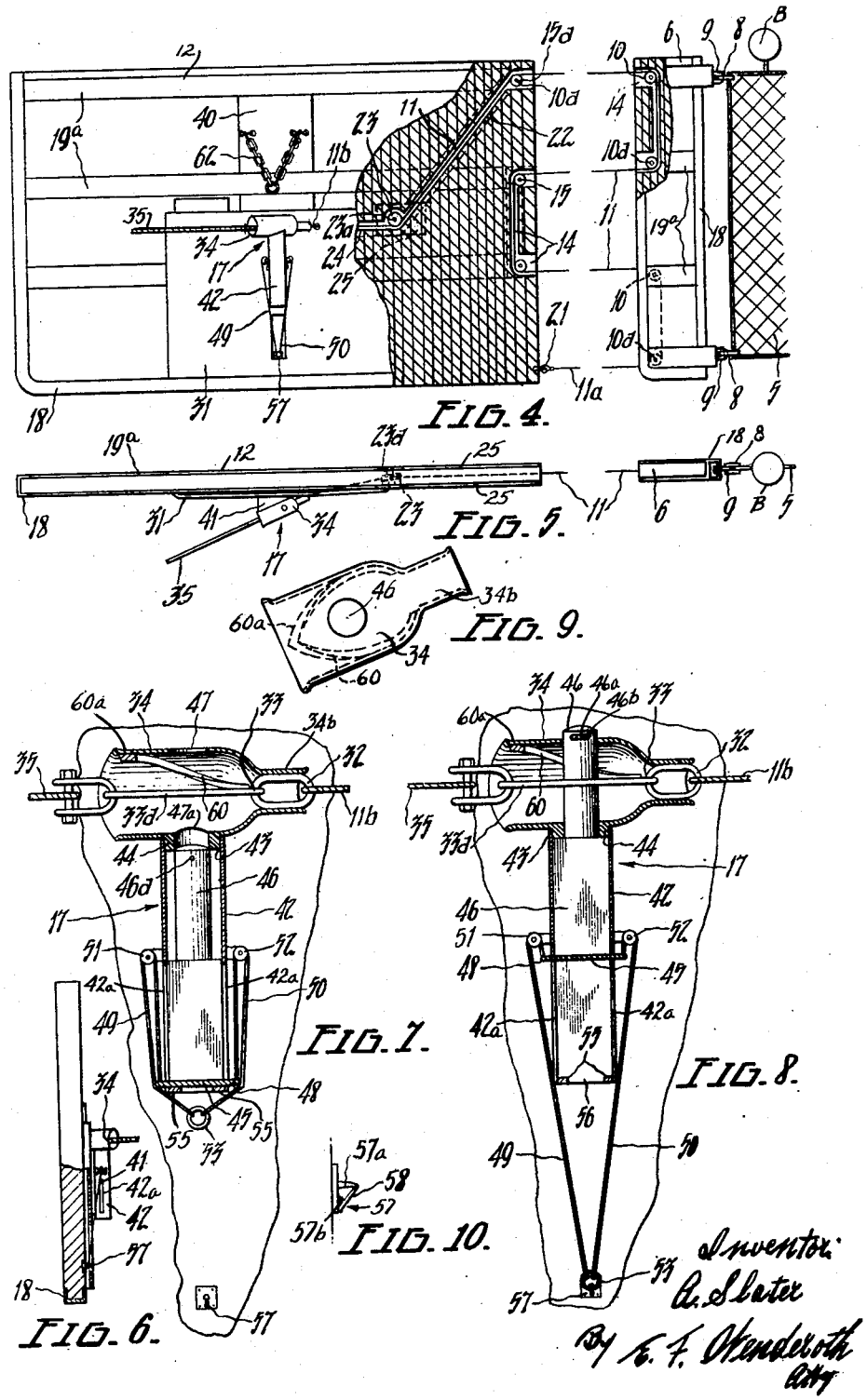

Patented Dec. 2, 1952

2,619,754

UNITED STATES PATENT OFFICE 2,619,754

TRAWLING NET AND APPARATUS FOR USE THEREWITH

Alexander Slater, West St. Kilda, Victoria, Australia

Application September 7, 1948, Serial No. 48,136
In Australia September 25, 1947

13 Claims. (Cl. 43—9)

This invention relates to trawling nets of the type used with trawlers for deep sea fishing.

The seine nets at present employed with trawlers have a limited capacity and are required to be of considerable size, particularly at the mouth, to trap the fish whereby there is a considerable drag at the greater depths of water, which contributes to the expenditure of power and the cost of trawling.

Incidentally the wide mouth of the trawl net does not effectively trap the fish, which except in massed shoals have complete freedom to escape at either side of the wings and mouth.

Now the principal objective of the present invention is to materially reduce the above described disadvantages by an improved trawling net, including provision of means for penning the fish in advance of the net so as to be effectively trapped in the latter. Thus in a trawl net according to the invention, its effective width is considerably increased so that in a given area, fewer sweeps are required by the trawler to fish that area, relatively to the number by existing trawlers, with attendant economy in time and labour. Moreover, the width of the mouth and wings may be decreased without effecting the capacity of the net, whilst reducing the draft or drag of the net. This provides economy in the running costs of the trawler, and importantly provides for the expeditious return to port of the trawler for the sale or storage of the fish.

With the above stated objective in view, there is provided according to this invention, a trawling net of the type having wings extending from each side of the mouth, a member spaced from each wing, a cable or wire extending serially between each member and each wing to comprise a series of superimposed parallel lengths of the wire extending between the former and the latter, and locking means associated with each member through which means one end of the wire is connected to a warp line so as to normally maintain the relative spaced positions of the wings and the members with the wire lengths diverging from the wings to said members to form a race or pen in advance of the wings and mouth of the net.

More specifically the trawling net comprises a board attached to each wing, an outer board spaced from each net wing board, a wire extending serially in spaced lengths between each net wing board and outer board, and locking means upon each outer board through which means one end of the wire is connected to a warp line to normally maintain the latter board substantially vertical and in spaced relation to the wing net board, with the wire lengths diverging from the wing net boards to the outer boards to form a race or pen in advance of the wings and mouth of the net.

The parallel lengths of wire between the above-mentioned net wing and outer boards, assuming an outwardly and forwardly angular, i. e. diverging, relation to the wings, whilst trawling, form in effect a pen and operate to pen the fish therebetween, in advance of the mouth of the net, as the wire lengths disposed one above the other with the lowermost length travelling over the sea bed, and moving through the water tend to flush and guide the fish to the line of draft of the mouth.

As the net is being payed out from the ship and after the net has travelled the distance necessary to form the multiple number of wire lengths, the outer boards are manually locked to the warp lines by said means, whereby the net wing boards and outer boards then maintain the required spaced relation with the wire lengths extending in a diverging relation from the wings of the net centrally disposed therebetween whereby the effective area of the net is increased.

Upon the trawling net being hauled in to the trawler for unloading, the outer boards are temporarily suspended, and the locking means for the warp lines released, whereby the pull is then applied directly to the wire lengths and to the net wing boards and the net, which resultantly are drawn up to the suspended outer boards whereat the net may be swung aboard for handling and discharge of the fish in the conventional manner.

The accompanying drawings depict a practical arrangement of a trawl net, according to the invention.

In the drawings:

Fig. 2 is a semi-diagrammatic plan of the trawl net illustrating diagrammatically the wire length between the outer boards and the wing boards, the attachment of the wire lengths to the warp lines and the extension of the warp lines from the trawler.

Fig. 3 is a semi-diagrammatic front elevation of the trawl net illustrated in Fig. 1.

Fig. 4 is a detail elevation partly in section of one of the outer boards connecting the wire lengths and an associated net wing board also connecting said wires.

Fig. 5 is a plan view of the outer board illustrated in Fig. 4.

Fig. 6 is a side elevation of one of the outer boards with the locking mechanism attached thereto for connecting the wire to one of the warp lines and connecting the latter to said board.

Figs. 7 and 8 are similar views in section of the locking means disposed upon the outer boards, Fig. 7 illustrating the locking mechanism, in the released position to permit the wire and warp line to move in unison and in Fig. 8 the locking mechanism is shown in the operative position in which the outer board is fixed to the warp line and the net wing board is spaced from the outer board.

Fig. 9 is a plan view of member 47 as illustrated in Figs. 7 and 8 with certain parts omitted.

Fig. 10 is a detail view of a spring loaded catch.

Fig. 11 is a side elevation of the associated gallows frames on the trawler for connecting the warp lines and bringing aboard and paying out the net.

Fig. 12 is a similar view of one of the gallows frames with an outer board connecting the wire lengths suspended thereon.

Fig. 13 is a similar view illustrating the associated net wing board drawn up to the outer board illustrated in Fig. 12.

Figs 14 and 15 are similar views of the outer and net wing boards illustrated in Fig. 3 but modified with regard to the number of wire lengths.

Figure 1:
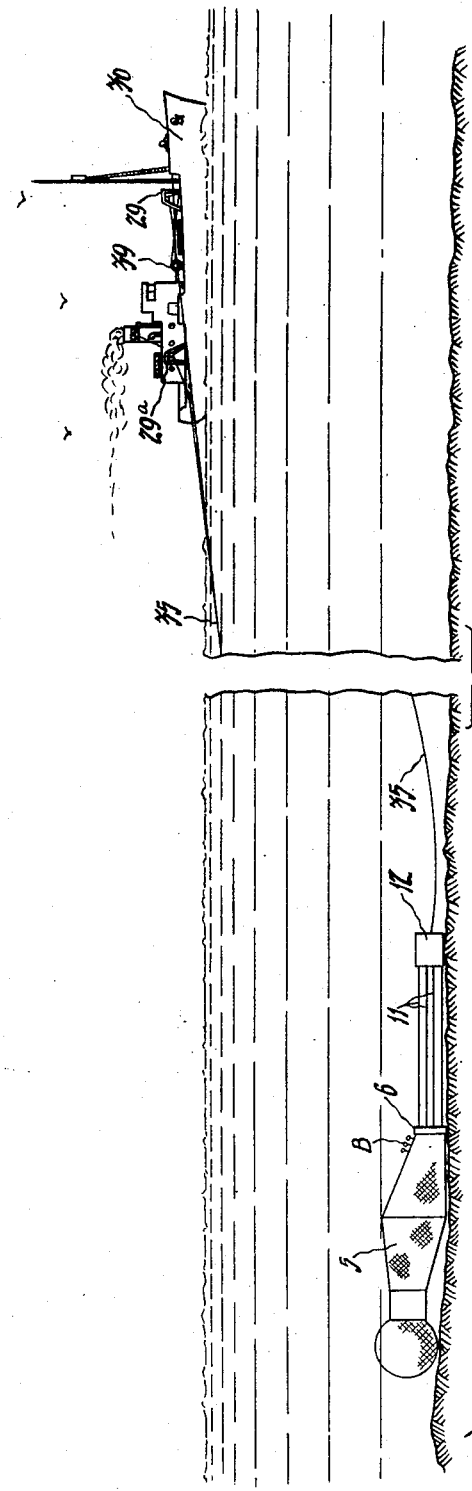
Fig. 1 is a side elevation of the trawl net in the operative trailing relation to a trawler.

Referring now to the drawings, mounted at each end of a substantially conventional trawling net 5 is one of a pair of net wing boards 6, 7 which are conveniently attached to the net by means of shackles 8 secured to the frame ropes at the front of the wings of the net, and a pair of brackets 9 attached to one side of the net wing boards 6, 7.

On the opposite side of each board 6, 7, are mounted a series of pulleys 10 adapted to carry a wire 11, which extends transversely and serially between the net wing boards 6, 7 and a pair of outer boards 12, 13 spaced at some distance from the net wing boards. The multiple number of parallel lengths 11 extending between the boards comprise a pen in advance of the mouth of the net.

The outer boards 12, 13 and the net wing boards 6, 7 in each case comprise a built-up body portion of wooden planks, that may be glued or otherwise secured together to form a composite body structure.

A number of passages 14 are formed in the both boards to provide suitable housings to accommodate the pulleys 10 in the net wing boards 6, 7 and the pulleys 15 on the outer boards carrying the wire lengths. On the inner side of each of the outer boards 12, 13 there is provided locking mechanism associated with the strands or wires and indicated generally by 17.

The outer and bottom edges of the net wing boards 6, 7 and of the outer boards 12, 13 are peripherally bound by continuous cover strips 18 of channel section metal, whereby these edges are protected from damage by impact with marine objects or growths as the net traverses the sea bed.

Glass balls B known generally as "float" glass are attached to the wings of the net to materially assist in maintaining the net wing boards 6, 7 in the upright position.

Extending respectively along the wing boards 6, 7 and the outer boards 12, 13 are a number of longitudinal reinforcing strips 19a, each of which covers one of the pulley housing recesses 14 cut in the built-up wooden body sections of the boards.

The above-mentioned pulleys 10 and 15 carrying the transversely extending pen forming wire lengths are mounted on axles 10a located between the longitudinal reinforcing strips 19a, respectively.

The number of pen forming wire lengths used in each trawling system may be varied, according to the types and aims of the fish being trawled or nature of the fishing ground, and consequently with any particular number of wire lengths, a separate construction of pulleys and arrangement of longitudinal reinforcing bands will be necessary.

In Figures 1 to 5, there is illustrated a trawling net system provided at each side with a set of four pen-forming wire lengths, and specially adapted for use in trawling for haddock, salmon or similar kinds of fish. In such a trawling net system, each outer board is provided with three pulleys and the wing board, connected by pen forming wire lengths with the former, with four pulleys, as is clearly illustrated by Figure 4, which shows on an enlarged scale the wing board 6, pen forming wire lengths 11 and outer board 12 as viewed at the right or starboard side relative to the direction of travel of the trawler and net shown by Figure 2.

In the arrangement as viewed in Fig. 4 one inner end 11a of the wire 11 is shackled as at 21 to the lowermost edge of the outer board 12 and is adapted to pass serially around and between the pulleys on the two boards and through the appropriate grooves and recesses in each of the boards to form the parallel pen forming wire lengths. As viewed in Fig. 2 net 5 is disposed upon the sea bed and the wire lengths diverge from the net wing boards 6, 7 to the outer boards 12, 13 to extend the wings W and form in effect a pen in advance of the mouth 5a of the net 5 so as to increase the effective width of the net and flush the fish towards the line of draft of the mouth. As illustrated in Fig. 1 this is achieved by trawling the net with the lowermost wire length 11 over the sea bed.

After passing over the top of the uppermost pulley 15a mounted on the outer board 12, the wire passes through and along an inclined passage 22 formed in the wooden body and around an additional pulley 23 leading into a horizontal passage 24 in the outer board.

The pulley 23 is carried on an axle 23a mounted between two supporting plates 25 attached to the exterior of each outer board, and is inclined to the sides of the board in order to direct the wire through the above-mentioned locking mechanism 17 to a pulley block 28 mounted in the center of the gallows frames 29 and 29a hereinafter described, mounted upon trawler 30 in forward and aft positions respectively.

Intermediately of the horizontal passage 24, the leading end 11b of the wire 11 passes through a protecting plate 31 to the outer side of the board where it is connected to a smaller link 32 connected to a larger link 33, normally housed within an inclined guide tube 34 that forms a part of a locking mechanism 17, said tube being located at an inclination to the adjacent side of the outer board and disposed in a central position upon the outer board.

The larger link member 33 is connected to the warp 35 which, after passing through the gallows frames 29 and a series of pulley blocks 37 arranged on the trawler, are wound upon the drum 38 of a power operated winch mechanism 39 which controls the paying out and hauling in of the trawl net assembly from the trawler 30, the drum 38 being enlarged or extended or the radii of drum flange increased relatively to those at present employed, to take the wires 11. The warp lines 35, 36 for convenience are illustrated in Figures 1 and 2, in broken arrangement by the dotted lines intermediate of and connected to the ends of said wires, shown in full and connected to the outer boards 12 and 13, respectively and the trawler 30.

The locking mechanism 17 is mounted obliquely on the outside of the protecting plate 31 attached to the longitudinal reinforcing strips 19a upon each outer board. A metal wedge 41 is secured between the guide tube 34 and the protecting plate 31 upon which it is mounted, to maintain the guide tube in its inclined relationship to the board. Thus in virtue of the inclination of the guide tubes 34, the warp lines 35, 36 extending in to the tubes are also inclined relatively to the surface of the outer boards and are connected to the latter at or about the centre to maintain the boards substantially vertical whilst being drawn through the water responsive to the uniform pull extended by each warp line, and the drag of the net and wings contributes to maintaining the boards in the vertical position.

Associated with the obliquely arranged guide tube 34 and also mounted on the outside of the above protecting plate 31 is a box 42 having in its upper portion an open rectangular hole 43 adapted to accommodate a rectangular boss 44 on the under side of the guide tube 34. Slidably arranged within the box 42 is a cradle 45 carrying a central locking pin 46 adapted to pass through the link 33 connecting the wires 11 to the warp lines 35, 36, and into and through diametrically opposite apertures 47 and 47a provided respectively in the upper and lower sides of the guide tube 34. The cradle 45 is provided with a pair of lugs 48 passing outwardly through vertical apertures 42a in the casing of the box 42 to connect a pair of wires 49, 50 extending over a pair of pulleys 51, 52 mounted upon the side of the box 42 immediately above each vertical aperture 42a. Both wires 49, 50 are connected at their lowermost ends to a common ring 53 which when manually pulled downwardly will raise the central locking pin 46 into locking engagement with the aperture 47 in the upper edge of the guide tube 34, thereby preventing any further movement of the warp lines 35, 36 in relation to the outer boards and pen forming wire lengths 11.

In its lowered position the cradle 45 is adapted to rest on a pair of detachable transverse bars 55 extended across the bottom of the box 42 and separated by an opening 56, the cradle 45 and locking pin 46 being removable and replaceable upon detachment of the two bars 55.

A spring loaded catch 57 is positioned on the inside of the outer board directly below the rectangular box 42 and is adapted to receive and retain in its lowered position the ring 53 joining the two wires 49, 50 that are connected to the cradle 45. Thus, when the ring 53 is lowered to raise the locking pin 46 into engagement with the aperture 47 in the upper side of guide tube 34, the ring 53 may then be passed over a fixed finger portion 57a of the above catch 57 and will be held in place by a detent 58 which is spring influenced by spring 57b which normally closes the opening of the spring loaded catch 57.

A diametrical hole 46a is provided in the upper cylindrical portion of the locking pin 46, and a split pin 46b, wedge or other suitable member may be inserted into this hole to relieve a portion of the strain from the cradle 45 and the supporting wires 49, 50.

In order to guide the large link 33 into a horizontal position in the guide tube 34 whereby the locking pin 46 is permitted to pass freely through the link 33 in its upward or downward movements, a pair of guiding projections 60 are located on the interior of the guide tube 34.

The guiding projections 60 emanate from a common V-shaped head 60a in the upper central edge of the guide tube 34, and extend on a partial spiral along the inside of the guide tube, terminating in a diametrically opposed relationship approximately midway down the diameter of the tube toward the smaller end 34b thereof as illustrated in Figs. 6, 7 and 9.

Also mounted on each of the outer boards 12, 13 is a bridle chain 62 operable for the purpose to be hereinafter described.

As illustrated in Fig. 11 the pair of gallows frames 29 and 29a is erected on one side of the ship in fore and aft positions, and it will be understood that a pair would also be provided on both the port and starboard side of the ship, although only one pair is used at any one time.

The gallows frames 29 and 29a constructed in accordance with this invention are of substantially inverted U-shape and each includes a central pulley sheave 28, carried by a chain 64 depending from the upper horizontal portion of each gallows frame. A further pulley 65 is also mounted in the lower portion of each gallows frame fore leg 29c.

A supporting chain 66 and a hook 67 on its outer end is carried by a pulley 68 attached to the upper portion of each gallows frame and the other end is adapted to be anchored to the aft leg 29b of the forward gallows frame and to the forward leg 29c of the aft gallows frame by winding it around cleats 69 mounted on said legs of the gallows frames. The chain 66 is formed near to the hook and thereof with a link 66a larger than the other links which constitute the main length of chain, the dimensions of the larger link being such that it is unable to pass through the pulley sheave. Thus, in operation when sufficient fish are enclosed within the net and it is desired to haul the net into the trawler, the latter is turned broadside onto the net whereby an even pull is imparted to each of the warp lines 35, 36. The winch 39 is then operated to haul in the warp lines 35, 36 until the outer boards 12, 13 are drawn into a position similar to that shown in Figure 12 of the accompanying drawings which shows the outer board 12 drawn up to and supported by the forward gallows 29, the outer board 13 being hauled up to and supported by the aft gallows 29a as shown in Fig. 13. The hook 67 of the supporting chain 66 is then connected to the bridle chain 62 of each outer board 12, 13 and said chain 66 pulled in until the enlarged link 66a of the chain prevents any further movement of the outer boards 12, 13 which latter will then be raised into a predetermined centrally located position, as in Fig. 13, with the guide tube 34 from which the warp line is extended, directed towards the central pulley block 28 of each gallows frame. The ring 53 connecting the cradle 45 is then released from and by the spring operated catch 57 and the cradle lowered, causing the locking pin 46 to move out of its operative position in the guide tube 34 and the winch 39 is further operated to draw in the wire lengths 11 by means of the guide tube 34 and the aforementioned pulleys 37 used in hauling in the warp lines.

With each outer board suspended upon a gallows frame 29 as viewed in Fig. 13, the release of the locking mechanism 17 as described, causes the pull from the warp lines 35, 36 to be directly applied to the wires 11 which are then hauled in by travelling around the pulleys whereby the net wing boards 6, 7 are resultantly drawn towards the outer boards 12, 13. To achieve this the wires and rollers or pulleys act as a system of pulleys as will be apparent from Fig. 4. When the net wing boards 6, 7 have reached the position adjacent the outer boards 12, 13 the net 5 with the catch is suspended therefrom broadside on to the trawler.

In this way the trawl net 5 will be brought alongside the trawler 30 as shown partly in Fig. 13 of the drawings, and the catch may be delivered from the net to the trawler in a manner well known to those skilled in the art.

Having discharged the catch from the net 5, the latter is dropped overboard between the particular pair of gallows frames 29 and 29a, and the length of wire to form the pen forming strands is run off from the winch until the junction of the warp lines 35, 36 with the wires 11 including the large link 33 enters the guide tube 34. The large link 33 checks the run of the wires 11 as it cannot pass through the reduced end 34b of the guide tube. This is an indication to the operator to adjust the locking mechanism 17 whereby the outer boards 12, 13 are fixed in the required spaced relation to the net wing boards 6, 7 as no further paying out of the wires 11 can then take place.

The outer boards 12, 13 are released to pass overboard in the wake of the net wing boards 6, 7, and the warp lines 35, 36 are payed out to accord with the depth of and distance astern of the net.

In practice there will be two pairs of similarly constructed boards arranged so that the starboard outer board and the starboard net wing board act as a pair of boards; similarly, the port outer board and the port net wing board act as a further pair of boards, with the guide tubes upon each outer board facing toward the ship.

In the practical arrangement described, four pen forming wire lengths were employed, but as illustrated in Figs. 14, 15 I may employ either three or five pen forming wire lengths $11^1$ by an appropriate arrangement of pulleys $10^1$ and $15^1$ upon the net wing boards $6^1$, $7^1$ and outer boards $12^1$, $13^1$ without otherwise varying the construction and operation of the boards and locking mechanism 17 hereinbefore described.

I claim:

1. A trawling net having a wing extending from each side of the mouth of the net, a wing board attached to each wing, an outer board spaced from each wing board, a single length of wire extending continuously in a to and fro arrangement between and attached to each wing board and outer board to comprise a series of superimposed parallel lengths of wire between said boards, a pair of warp lines, and locking means upon each outer board to connect the latter to one of the warp lines and in which means one end of the wire is connected to the warp line to normally maintain the outer boards substantially vertical in spaced relation to the wing boards with the parallel wire lengths extending from the wing boards to the outer boards and forming a race or pen in advance of the wings and mouth of the net.

2. A trawling net having a wing extending from each side of the mouth of the net, a wing board attached to each wing, an outer board spaced from each wing board, a single length of wire extending continuously in a to and fro arrangement between and attached to each wing board and outer board to comprise a series of superimposed parallel lengths of wire between said boards to form a race or pen in advance of the wings and mouth of the net, a pair of warp lines, and locking means upon each outer board to connect the latter to one of said warp lines and through which means one end of the wire between said outer board and the wing board is connected to the end of one of said warp lines whereby the parallel wire lengths are coextensive with the warp lines to permit relative movement of the wing boards towards the outer boards upon release of the locking means.

3. A trawling net having a wing extending from each side of the mouth of the net, a wing board attached to each wing, an outer board spaced spaced from each wing board, a number of pulleys or rollers journalled in each wing board and outer board, a single length of wire connecting each wing board and outer board and attached at one end to one of said boards and extending serially about the pulleys or rollers and between the wing board and outer board to comprise a series of superimposed parallel lengths of the wire between said boards, a pair of warp lines, and locking means upon each outer board to connect the latter to one of said warp lines through which means the other end of the wire between said wing board and outer board is connected to the end of one of said warp lines whereby the parallel wire lengths are coextensive with the warp lines to permit relative movement of the wing boards towards the outer boards upon release of the locking means.

4. A trawling net having a wing extending from each side of the mouth of the net, a wing board attached to each wing, an outer board spaced from each wing board, a single length of wire extending continuously in a to and fro arrangement between and attached to each wing board and outer board to comprise a series of superimposed parallel lengths of the wire between said boards to form a race or pen in advance of the wings and mouth of the net, a pair of warp lines, a guide tube located upon and inclined relatively to the surface of each outer board and having diametrically opposite apertures, one end of the wire and one of said warp lines projecting into the guide tube, a link normally disposed within the guide tube to connect the wire to one of said warp lines, and an axially movable member slidably fitting said apertures to normally project through the link, the retraction of said member permitting the relative movement of the wing board towards the outer board responsive to a pull upon a said warp line.

5. A trawling net having a wing extending from each side of the mouth of the net, a wing board attached to each wing, an outer board spaced from each wing board, a single length of wire connecting each wing board to an associated outer board and extending continuously in a to and fro arrangement between said boards to comprise superimposed parallel lengths of the wire between said boards to form a race or pen in advance of the wings and mouth of the net, a pair of warp lines, a guide tube mounted upon and inclined relatively to the surface of each outer board and having diametrically opposite apertures, the other end of the wire and one of the warp lines projecting into the guide tube, a link normally disposed within the guide tube to connect the wire to one said warp line, and an axially movable member slidably fitting said apertures to normally project through the link, the retraction of said member permitting the relative movement of the wing board towards the outer board, responsive to a pull upon a said warp line.

6. A trawling net having a wing extending from each side of the mouth of the net, a wing board attached to each wing, an outer board spaced from each wing boarrd, a number of pulleys or rollers journalled in each wing board and outer board, a single length of wire connecting each wing board and outer board and attached at one end to one of said boards and extending serially about the pulleys or rollers and between the wing board and outer board to comprise a series of superimposed parallel lengths of the wire between said boards, a pair of warp lines, a guide tube mounted upon and inclined relatively to the surface of each outer board and having diametrically opposite apertures, the other end of the wire and one of the warp lines projecting into the guide tube, a link normally disposed within the guide tube to connect the wire to one said warp line, and an axially movable member slidably fitting said apertures to normally project through the link, the retraction of said member permitting the relative movement of the wing board, towards the outer board, responsive to a pull upon a said warp line.

7. A trawling net according to claim 6 and wherein the guide tube is formed at the inner end with a reduced portion, the size of which relatively to the dimensions of the link is such that the latter is prevented from passing through said end as the wing board is moving away from the outer board.

8. A trawling net having a wing extending from each side of the mouth of the net, a wing board attached to each wing, an outer board spaced from each wing board, a single length of wire extending continuously in a to and fro arrangement between and attached to each wing board and outer board to comprise a series of superimposed parallel lengths of the wire between said boards to form a race or pen in advance of the wings and mouth of the net, a pair of warp lines, a guide tube located upon and inclined relatively to the surface of each outer board and having diametrically opposite apertures, one end of the wire and one of the warp lines projecting into the guide tube, a link normally disposed within the guide tube connecting the wire to one said warp line, an axially movable pin slidably fitting the apertures to normally project through the link, a casing attached to the guide tube through which casing an extension of said pin projects, and a fastening means connected to said extension to retain the pin in locking engagement with said link.

9. A trawling net having a wing extending from each side of the mouth of the net, a wing board attached to each wing, an outer board spaced from each wing board, a single length of wire connecting each wing board to an associated outer board and extending continuously in a to and fro arrangement between said boards to comprise superimposed parallel lengths of the wire between said boards to form a race or pen in advance of the wings and mouth of the net, a pair of warp lines, a guide tube mounted upon and inclined relatively to the surface of each outer board and having diametrically opposite apertures, the other end of the wire and one of the warp lines projecting into the guide tube, a link normally disposed within the guide tube to connect the wire to one said warp line, an axially movable pin slidably fitting the apertures to normally project through the link, a casing attached to the guide tube through which casing an extension of said pin projects, and a fastening means connected to said extension to retain the pin in locking engagement with said link.

10. A trawling net having a wing extending from each side of the mouth of the net, a wing board attached to each wing, an outer board spaced from each wing board, a number of pulleys or rollers journalled in each wing board and outer board, a single length of wire connecting each wing board and outer board and attached at one end to one of said boards and extending serially about the pulleys or rollers and between the wing board and outer board to comprise a series of superimposed parallel lengths of the wire between said boards, a pair of warp lines, a guide tube mounted upon and inclined relatively to the surface of each outer board and having diametrically opposite apertures, the other end of the wire and one of the warp lines projecting into the guide tube, a link normally disposed within the guide tube to connect the wire to one said warp line, an axially movable pin slidably fitting the apertures to normally project through the link, a casing attached to the guide tube through which casing an extension of said pin projects, and a fastening means connected to said extension to retain the pin in locking engagement with said link.

11. A trawling net according to claim 10 and wherein the fastening means comprises a plate located within the casing in engagement with the extension of said pin, said plate having spaced lugs projecting through and working in elongated openings in the casing, a number of pulleys carried upon the casing, cables extending about the pulleys, a terminal common ring attached to the free ends of the cables, and a catch upon the outer board normally engaging said ring and releasable to permit a manual pull upon the cables to move said pin from engagement with said link.

12. In a trawling net according to claim 4, means within the guide tube to centrally locate and align said link with the apertures to receive the axially movable member.

13. In a trawling net according to claim 3 and wherein the pulleys or rollers are journalled in recesses in the boards which recesses are connected to passages through which the wire extends to pass around the pulleys or rollers.

ALEXANDER SLATER.

REFERENCES CITED

The following references are of record in the file of this patent:

FOREIGN PATENTS

| Number | Country | Date |
| --- | --- | --- |
| 25,838 | Holland | Jan. 15, 1932 |
| 218,198 | Great Britain | July 3, 1924 |
| 243,913 | Great Britain | Dec. 10, 1925 |